March 25, 1930.  A. E. HOLCOMB  1,751,633
LOCOMOTIVE CRANE
Filed Feb. 2, 1922   11 Sheets-Sheet 2
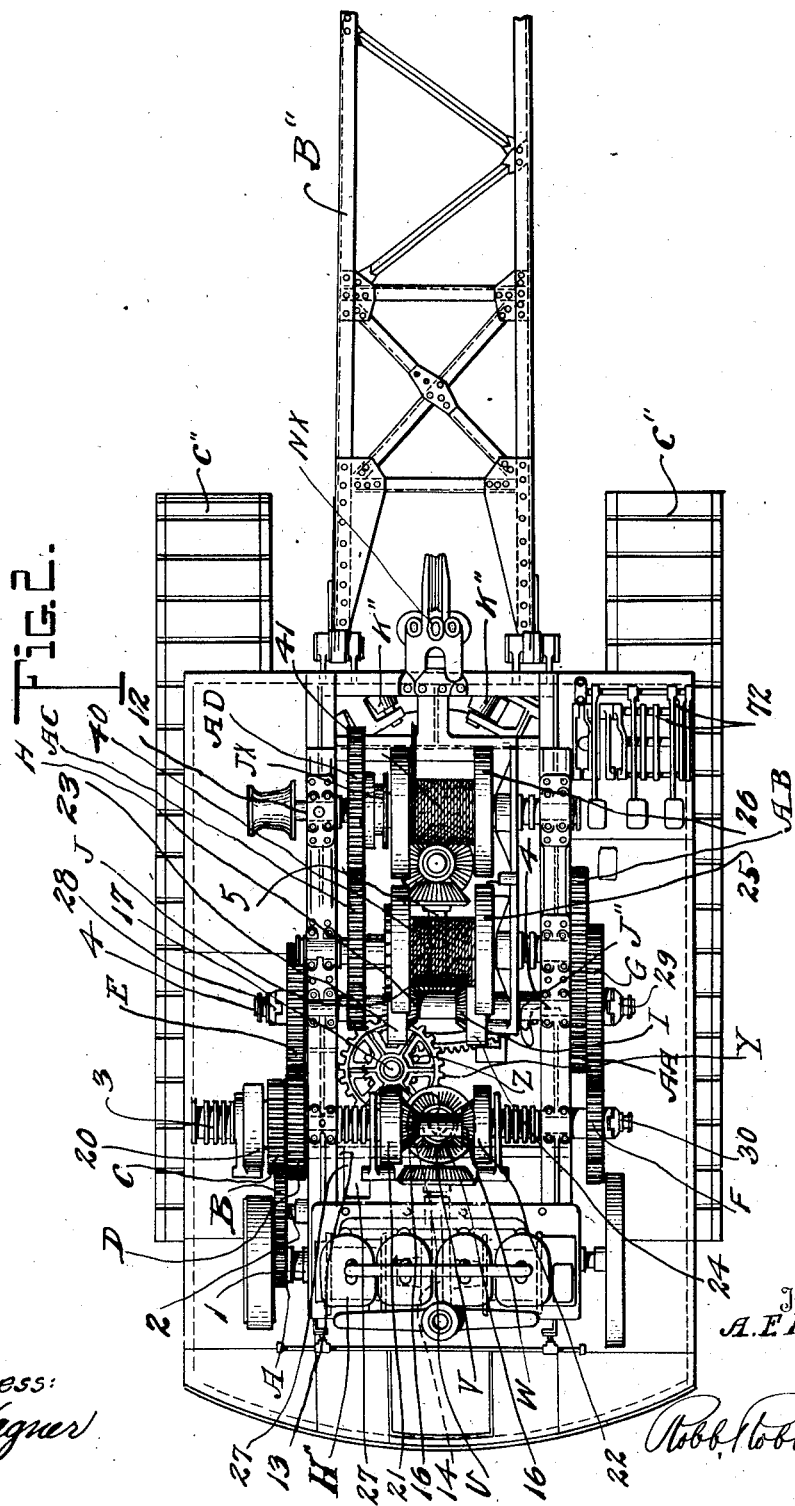

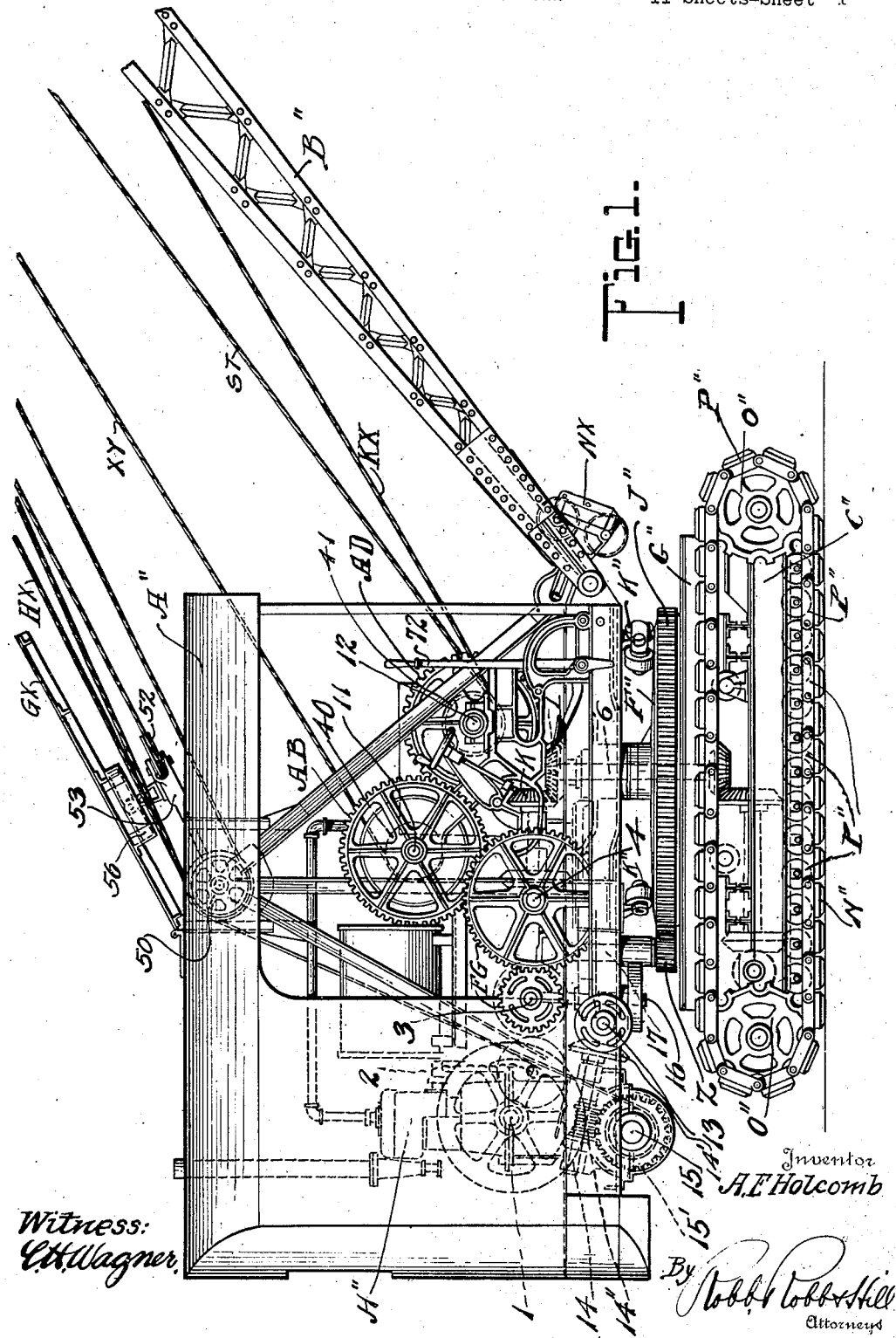

March 25, 1930.  A. E. HOLCOMB  1,751,633
LOCOMOTIVE CRANE
Filed Feb. 2, 1922   11 Sheets-Sheet 3
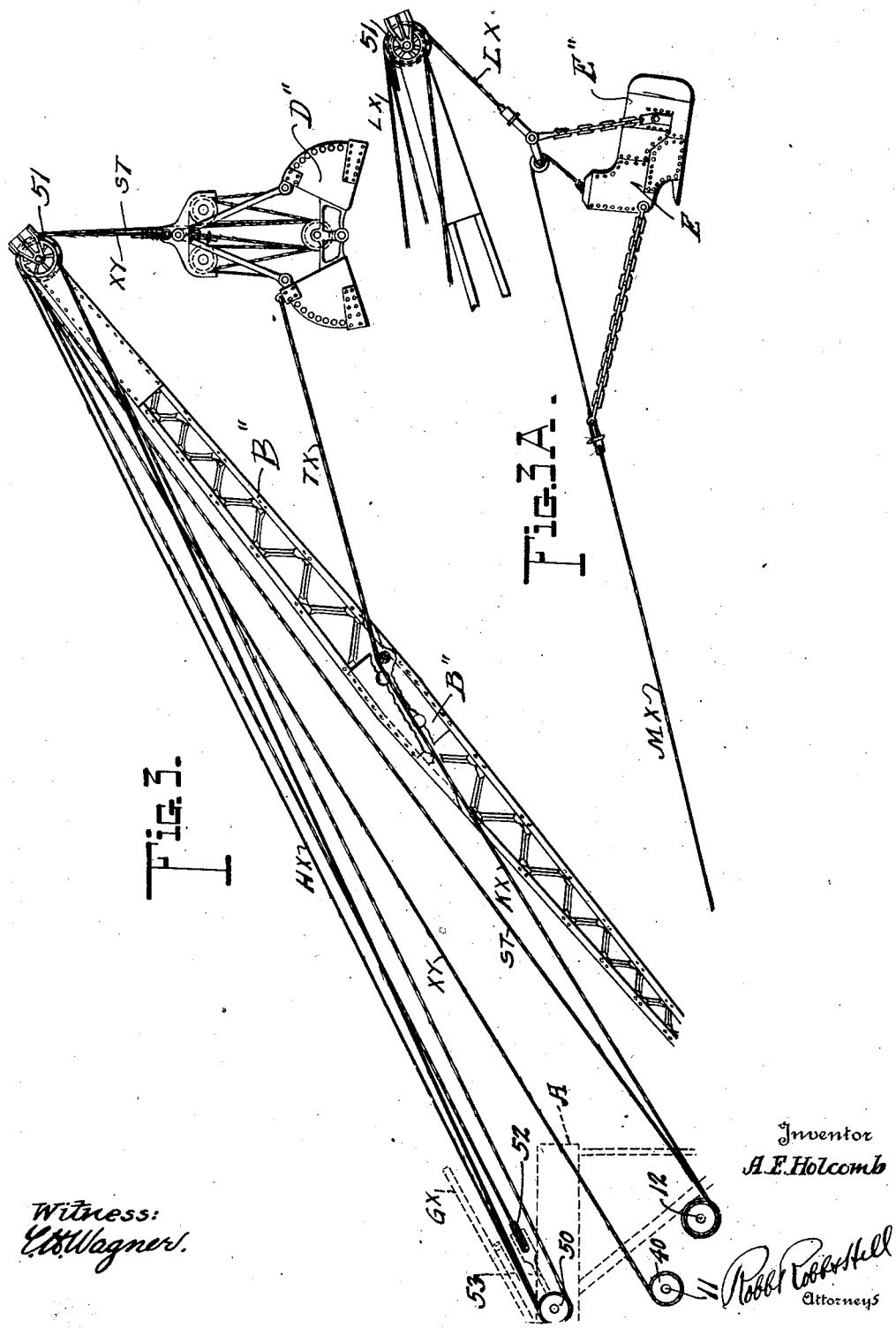

March 25, 1930.  A. E. HOLCOMB  1,751,633
LOCOMOTIVE CRANE
Filed Feb. 2, 1922   11 Sheets-Sheet 4
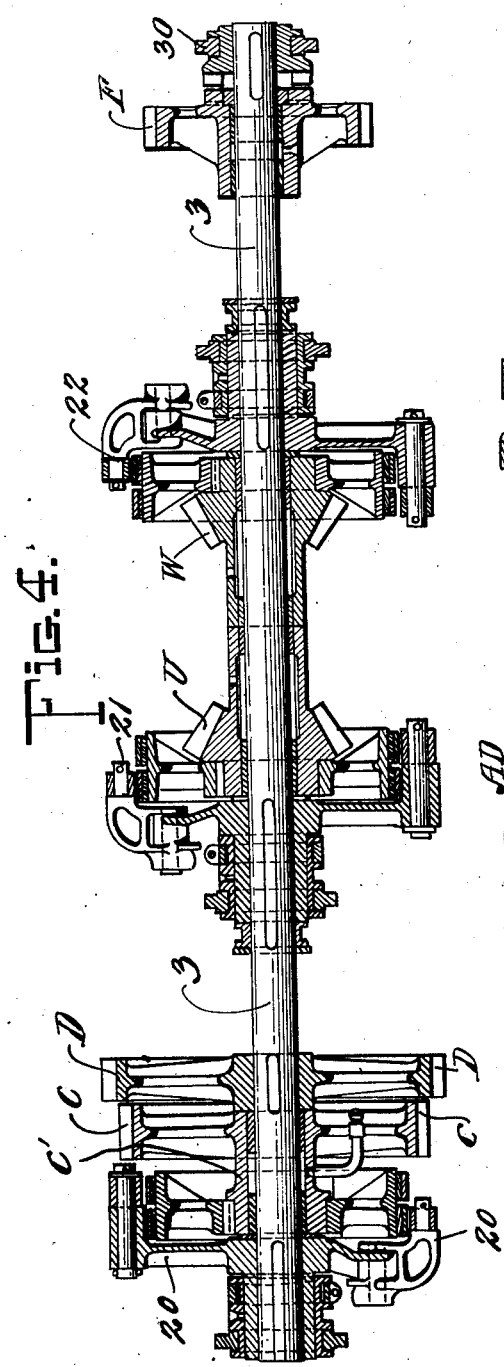
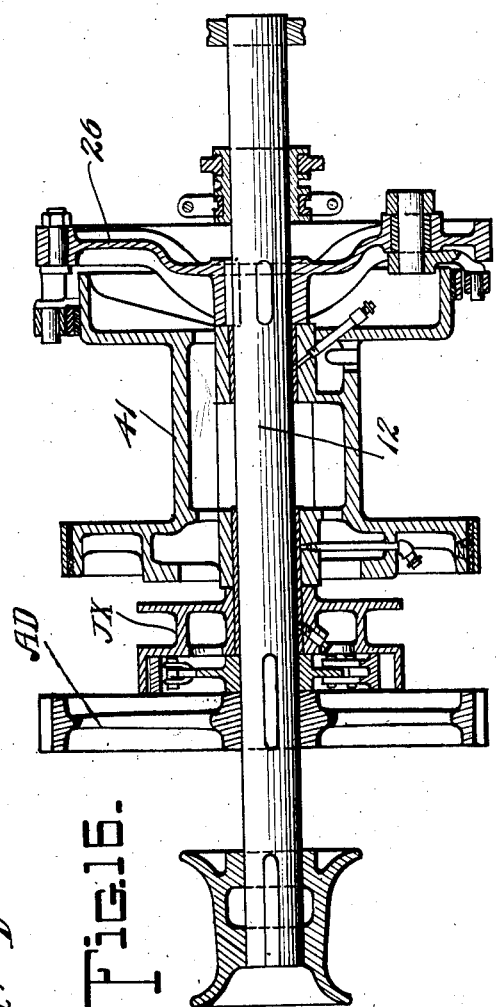
Witness:
C. H. Wagner
Inventor
A. E. Holcomb
By Robb, Robb & Hill
Attorneys March 25, 1930.　　　A. E. HOLCOMB　　　1,751,633
LOCOMOTIVE CRANE
Filed Feb. 2, 1922　　　11 Sheets-Sheet 5
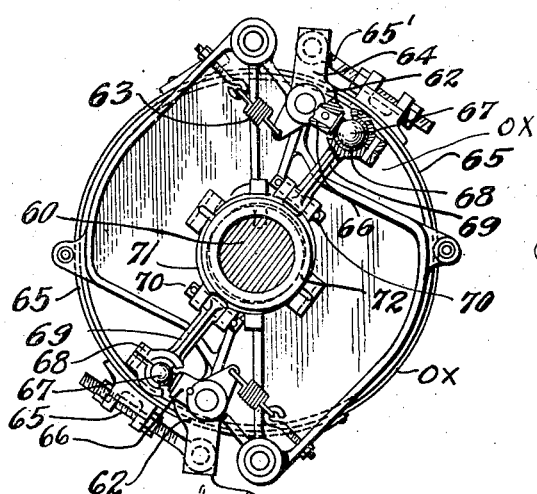
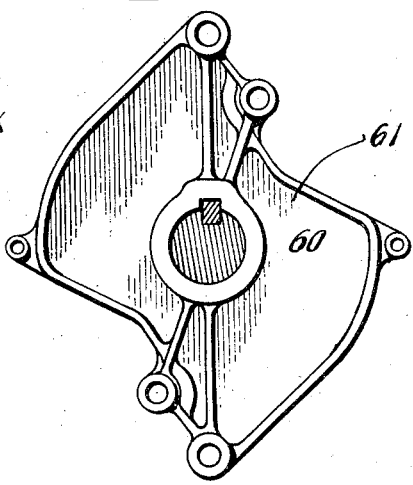
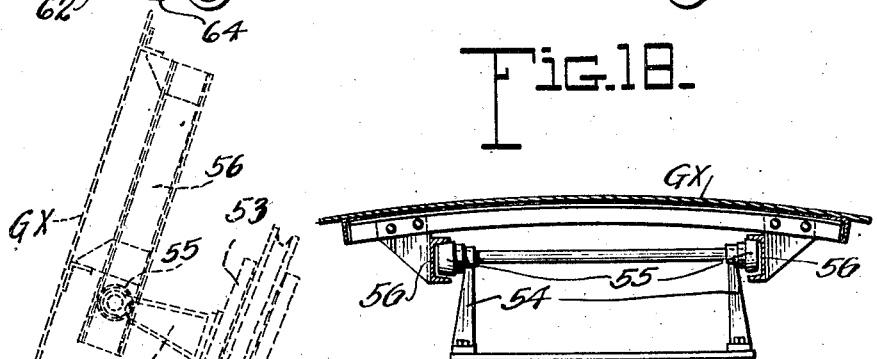
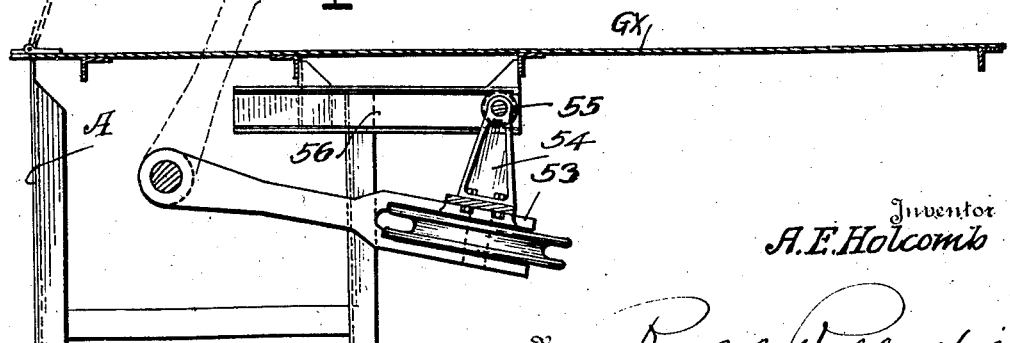
Inventor
A. E. Holcomb
By Robb & Robb & Hill
Attorneys
Witness:
C. H. Wagner

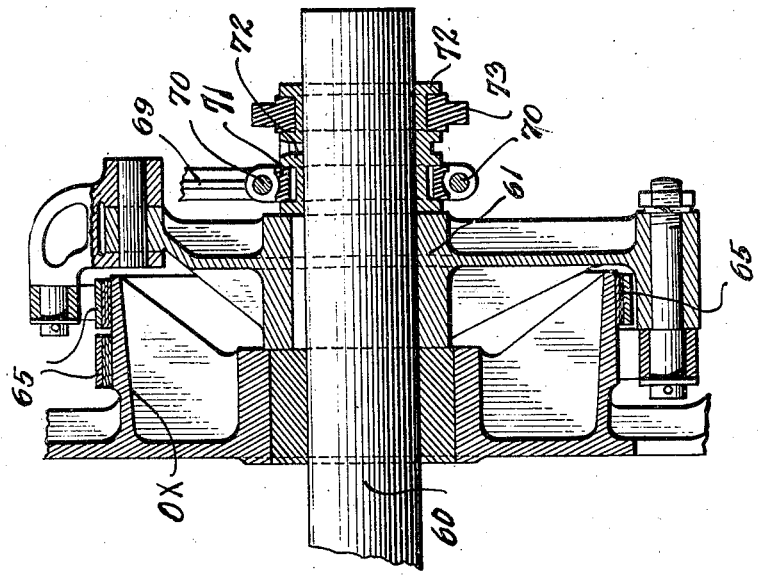

March 25, 1930.   A. E. HOLCOMB   1,751,633
LOCOMOTIVE CRANE
Filed Feb. 2, 1922   11 Sheets-Sheet 7
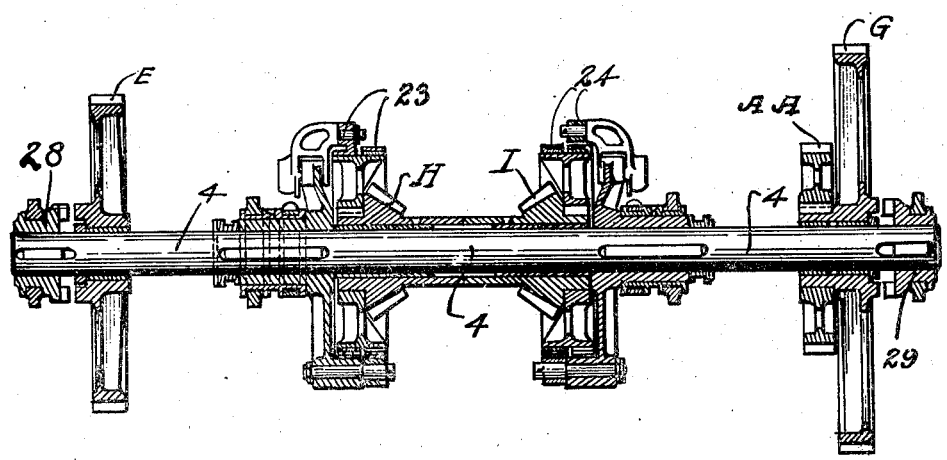
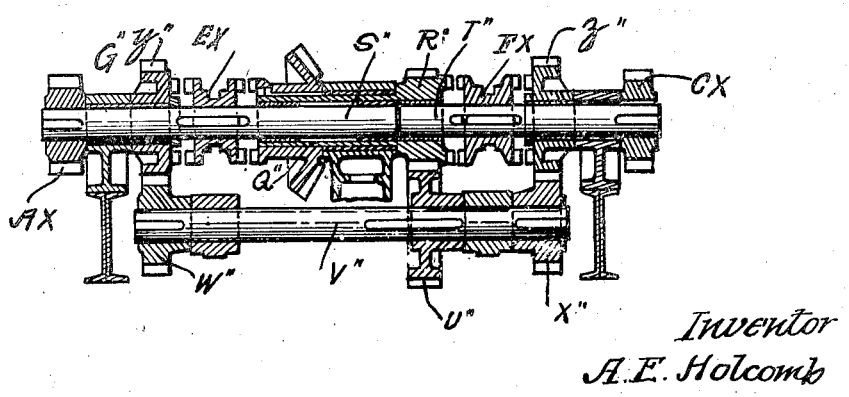

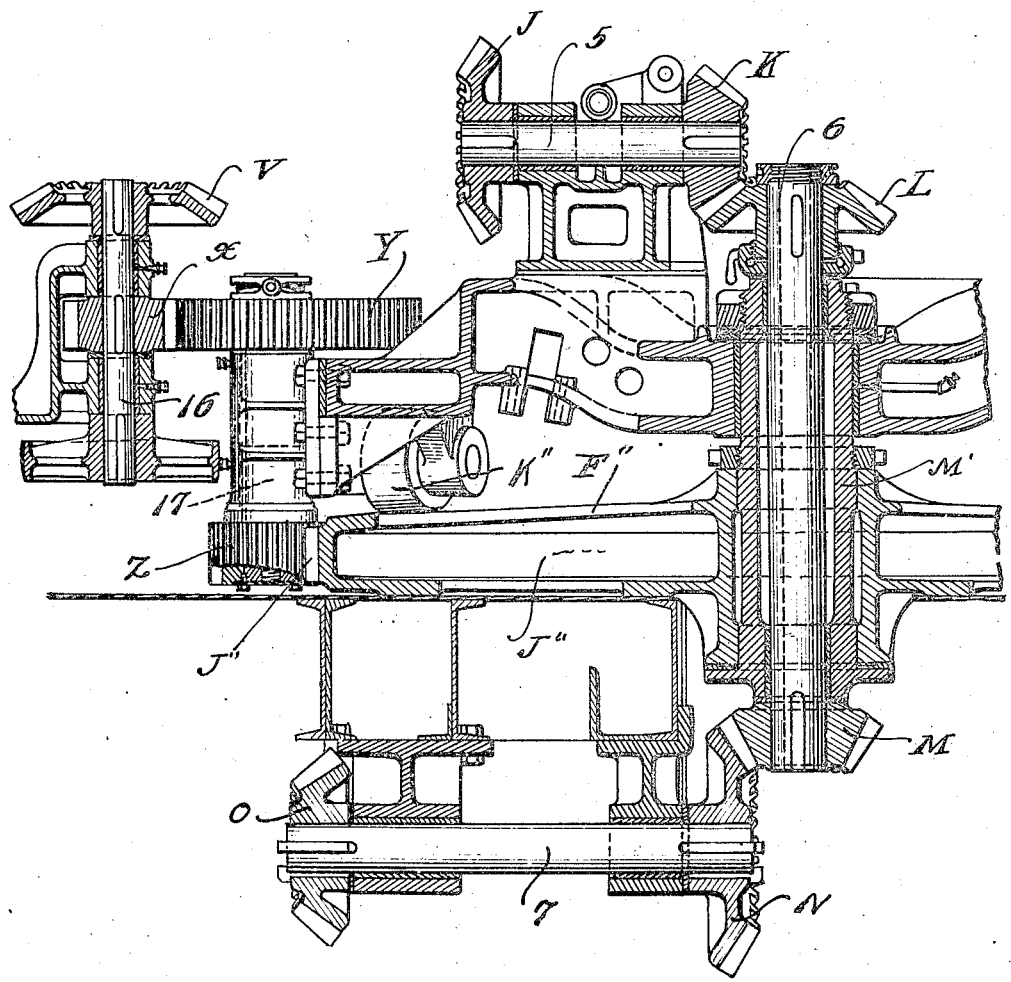

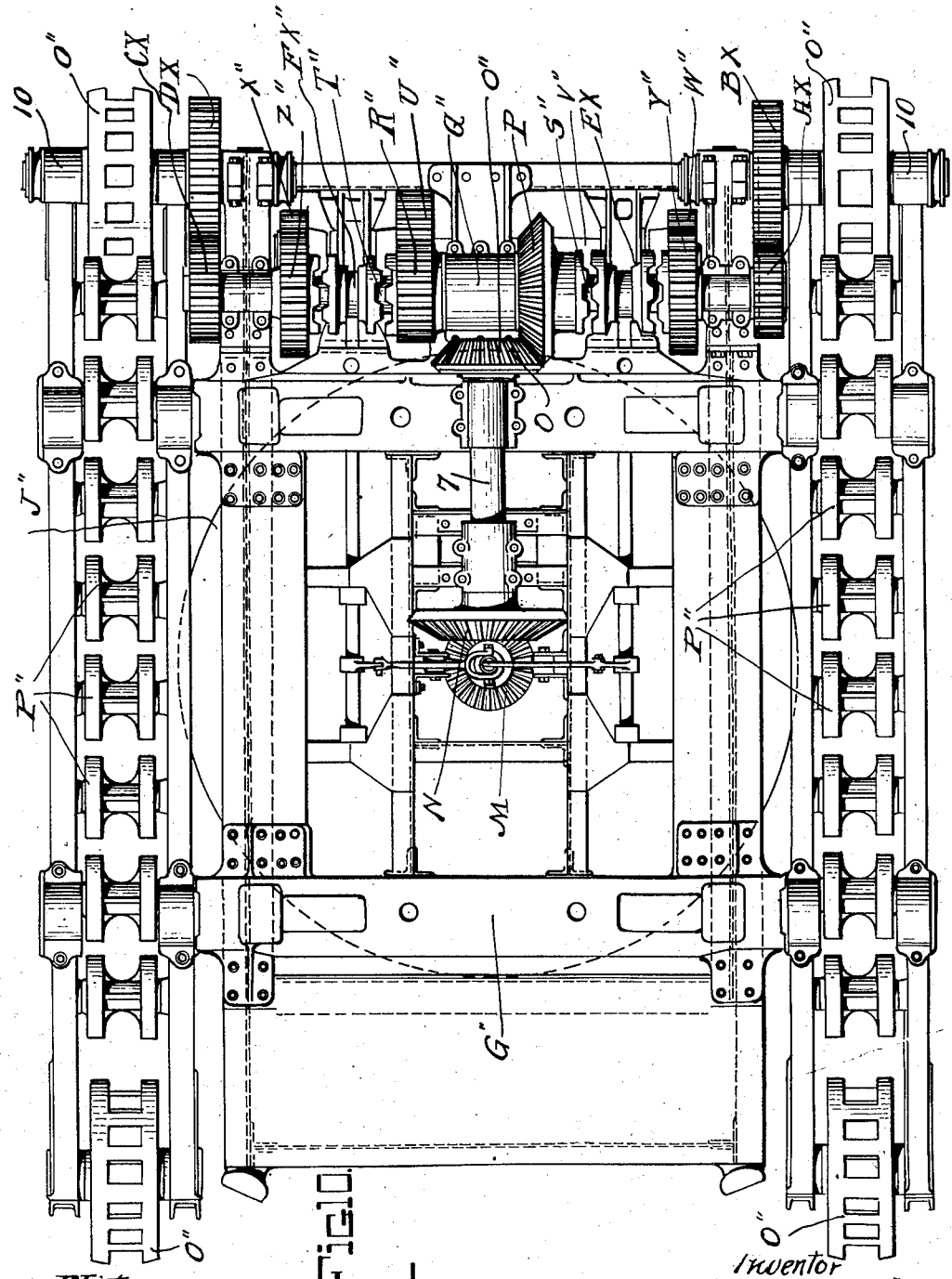

March 25, 1930. A. E. HOLCOMB 1,751,633
LOCOMOTIVE CRANE
Filed Feb. 2, 1922 11 Sheets-Sheet 10
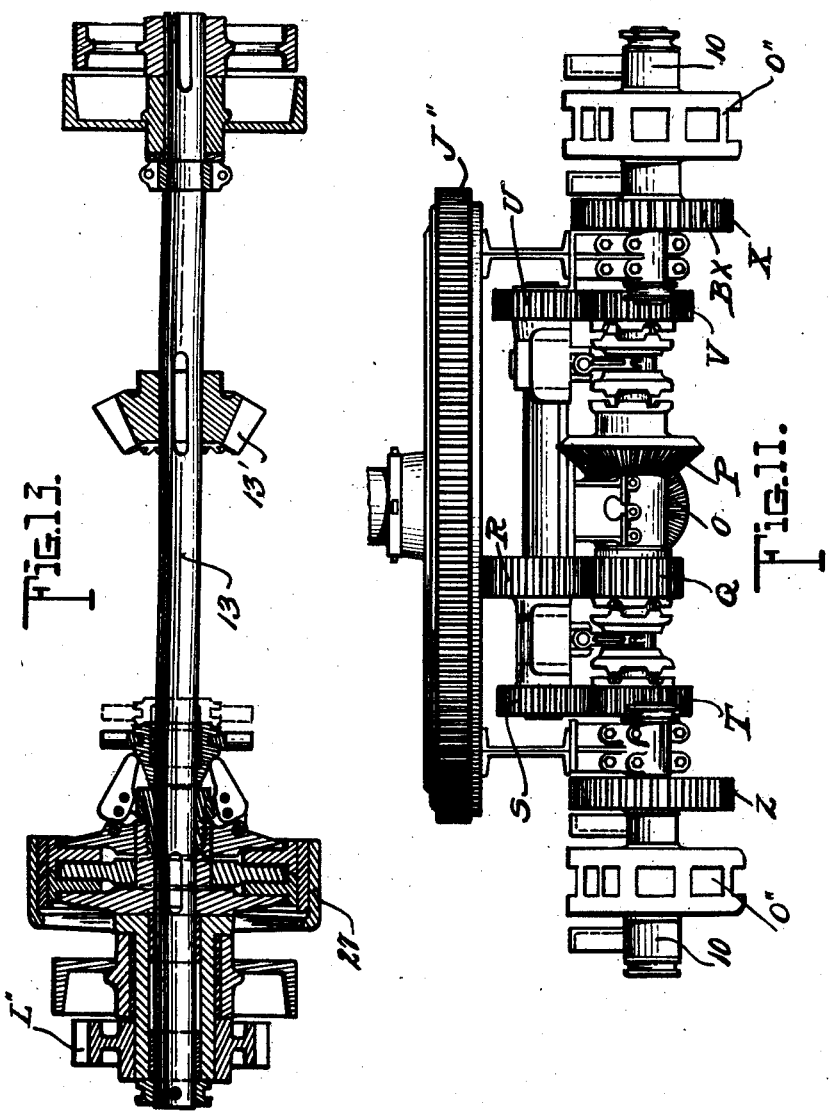
Inventor
A. E. Holcomb

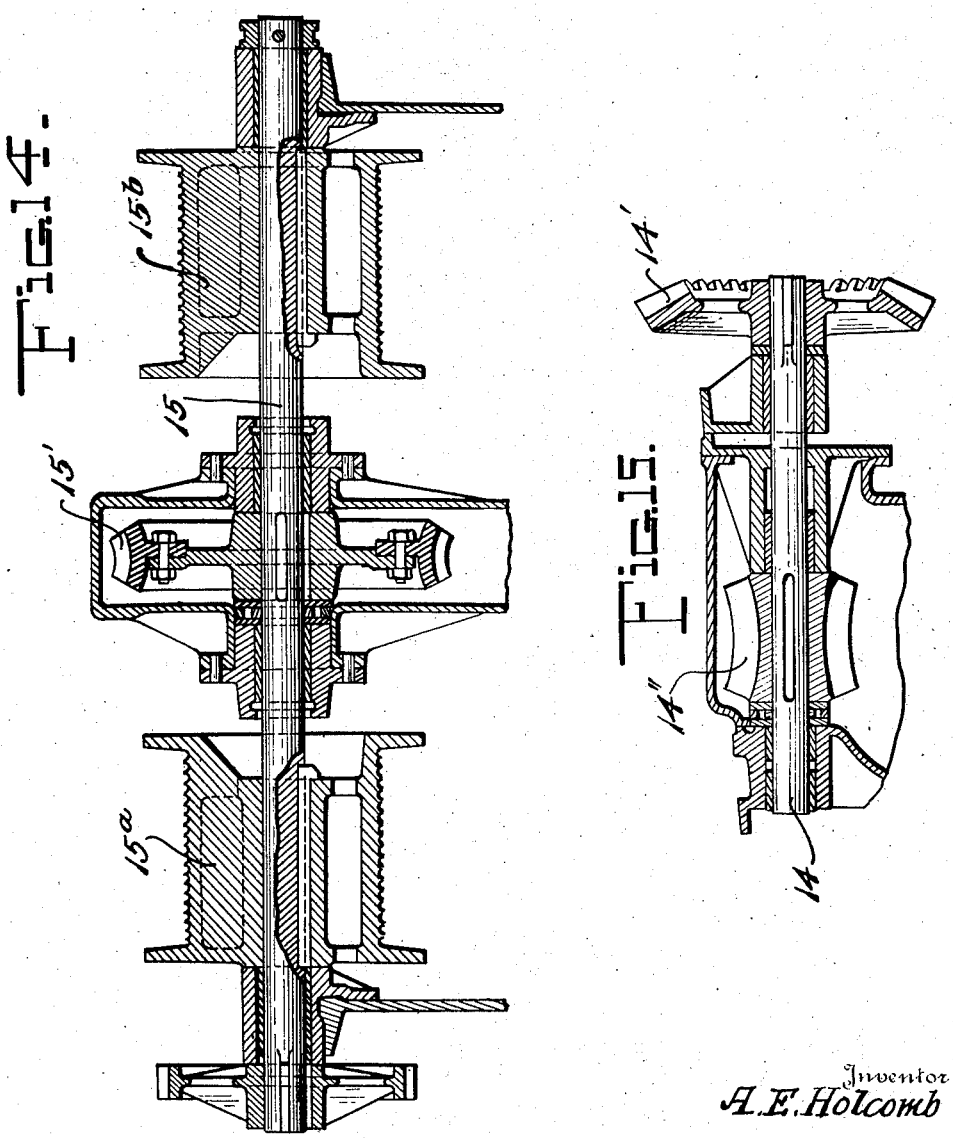

Patented Mar. 25, 1930

1,751,633

UNITED STATES PATENT OFFICE

ALPHEUS E. HOLCOMB, OF MILWAUKEE, WISCONSIN, ASSIGNOR TO KOEHRING COMPANY, OF MILWAUKEE, WISCONSIN, A CORPORATION

LOCOMOTIVE CRANE

Application filed February 2, 1922. Serial No. 533,633.

The primary purpose of my invention has been to evolve certain important improvements in the design of cranes and excavators of the portable class, and such as are commonly used in connection with clamshell, orange-peel and dragline buckets, or hoisting means comprising special blocks and tackle or electro-magnets.

An appreciation of the nature and advantages of the improvements developed by me, and hereinafter fully described in detail and claimed, will be best had after an understanding of certain methods of operation of cranes of the class above referred to, in the performance of different kinds of work.

It is known in the art that a crane equipped for the operation of a clamshell bucket utilizes an arrangement of operating cables for the bucket, adapted to travel at a high speed. To enable such a crane to operate a dragline or dragscraper bucket, it is commonly necessary to reconstruct the crane to a certain extent, because the cable drive in the dragline work must be such as to give a slow speed to the pulling in or dragline; likewise a different kind of cable is utilized. The reconstruction above mentioned involves the removal of one of the cable drums and certain operating gearing and the substitution for them of a different drum and train of gearing. This is a time consuming and expensive job and renders the crane inactive while the substitution is being made, thereby creating considerable loss in this respect additionally.

An important object of my invention hereof has been to eliminate the disadvantages at present arising in converting a crane equipped for clamshell or similar work into one adapted for dragline or similar work, and I have accomplished the desired result in a way eliminating entirely the reconstruction of the drum features of the crane. In practice I have designed a special drive for the crane drums by which the operating cables of the different types of buckets are controlled and this drive includes a variable speed gearing adapted to operate the cable drums so that when I am using a clamshell or like bucket I am enabled to drive the drums at the requisite high speed, imparting a corresponding high speed to the pulling in cable leading from the bucket to the crane. To permit of the conversion of the crane from clamshell or like work to that adapted for slower speed work, such as dragline bucket excavations, it is only required in my crane construction that a low speed clutch be thrown into action instead of a high speed clutch used for the higher speed work, and a dragline cable and bucket are substituted for the clamshell cable and bucket arrangements. The construction of the crane is in no way changed in the above conversion operation. A reversal of the expedients above outlined is resorted to in converting the crane from dragline to clamshell work, or in other words changing from slow speed bucket operations to high speed bucket operations, the different kinds of which operations are well known in the art. The economy of time and money incident to the conversion method above described is self evident as respects both the proposition of construction and the ability to maintain a substantially continuous use of the crane itself.

In carrying out the above accomplishment of my invention, I obtain a special additional function in the use of variable speed gearing, and controls therefor, by which I may employ my crane of fixed design for both high speed and low speed work. There are certain known operations of cranes, primarily hoisting operations incident to bucket actuation, and hoisting work generally, in which it becomes desirable to quickly and easily shift from high speed to low speed, or vice versa, in the operation of a hoisting cable and without making necessary, as is true today, the leading of the cables or lines through a multiple part block with incident expense and increased delay. An instance of this is the utilization of slow speed instead of high speed for the hoisting cable, for the setting of marble columns, or steelwork in process of fabrication; while the high speed would be employed for clamshell or similar work, and in pile driving. The high speed drive of the cable is especially valuable for catching the hammer on the rebound after dropping, in pile driving operations. Under conditions such as these it will be seen that mere operation of the high speed clutch, or the low speed clutch to obtain the desired speed on the drive of the cable may be resorted to with consequent increase in efficiency and utility of the crane in performing different operations of the class just discussed.

Another new and important feature of my invention resides in utilizing the driving mechanism for my hoisting drums of the crane as the means for driving the traction driving mechanism of the machine, the latter performing the usual purpose of propulsion of the crane in its work, and from place to place. More specifically speaking and explanatory of the foregoing, I utilize the novel expedient of combining the constructions and functions of the variable speed gearing by which the cable drums of the crane are operated, to drive single or variable speed gearing of the traction driving mechanism for the machine, whereby I am enabled to obtain a wider range of speed variations for the traction mechanism either for forward or rearward propulsion of the machine, or reverse operations of the supporting traction multiplanes, the latter causing turning movements of the machine in a manner more apparent hereinafter.

Not only is my method of converting my crane from high speed to low speed work, or vice versa, respecting the cable drive operations, believed to be broadly new in the art, but the mode of combining the variable speed driving means for the cable drums with the traction driving means is also an entirely novel expedient in crane construction, and in view of the large importance of the economies effected by the features of construction just mentioned, I do not wish to be limited wholly to the particular specific embodiments of these phases of my invention as presented hereinafter.

In effect, to a certain extent, the variable speed gearing as used by me in conjunction with the cable drum operations may be characterized as triple in its functions, owing to the different ways in which the said gearing is utilized, but I wish it understood that the individual functions of this gearing are believed to be novel individually considered, as well as combinatively viewed.

Another novel feature of my crane construction is the utilization of suitable clutch means or an equivalent control by which I am able to discontinue operation of the cable drums and their driving gearing when the crane is being propelled along the road at relatively high speed for purposes of transferring it from one place to another.

In the employment of cranes of the usual types largely marketed today, where friction clutches are employed for making connections between certain driving parts, much difficulty is experienced owing to the fact that the friction band of the clutch ordinarily tends to pull the drum face laterally creating rapid wear between the shaft and the bushing in the drum, which requires frequent replacements involving dismantling and re-assembling of a considerable portion of the machinery. I have designed a special type of friction clutch for my crane and doing away with the difficulty above referred to, by causing an equalization of the friction forces which act upon the drum thus doing away with the lateral pressure thereon causing the undue wear described. I thus retain all the advantages of the old type of band frictions while eliminating the objections outlined above.

Also shown in the crane construction hereinafter set forth, is a special form of canopy or roof involving a door automatically raised when the boom of the crane is peaked in to an extent causing it to move within the area of the space occupied by the roof. The novel features have to do with means to raise the door as the boom approaches a vertical position and positively hold the door against being blown over or twisted and to positively restore the door to its downward or closing position when the boom is lowered.

There are also involved in my invention certain detailed features of my machine having novelty of special merit in the art of crane development, and these features will be presented more clearly hereinafter by detailed description and shown in the accompanying drawings, in which:

Figure 1 is a side elevation of a crane embodying the essential features of my invention, boom and cables broken away.

Figure 2 is a top plan view showing more particularly the power plant, drive gearing, cable drums and clutches forming the machinery of the crane, and viewed as if the housing parts thereof were removed, the boom being broken away.

Figure 3 is a view of the boom and cable arrangements for clamshell work.

Figure 3A is a view of a modification showing the arrangement of the cables when the crane is adapted for dragline work.

Figure 4 is a sectional view of the jackshaft and the parts carried thereby including clutches, gears, etc.

Figures 5 and 6 are side and sectional views respectively of one of the drum friction clutches.

Figure 6A is a side view of the spider of the clutch.

Figure 7 is a side view of one of the swinging or engine clutches as shown carried by the jackshaft.

Figure 8 is a sectional view of the traction reverse shaft and parts carried thereby.

Figure 9 is a sectional view of the traction drive parts through the center pin of the crane turntable.

Figure 10 is a bottom plan view of the drive gearing for the multiplane traction devices, the endless multiplanes thus being omitted and the manner in which the multiplane units are geared and the drive gearing therefor being clearly shown.

Figure 11 is a view in elevation of the parts of Figure 10.

Figure 12 is a sectional view taken through the variable speed gear devices directly operating the multiplane traction units.

Figure 13 is a sectional view of the boom hoist countershaft and parts thereon.

Figure 14 is a sectional view of the boom hoist shaft and parts thereon.

Figure 15 is a sectional view of the boom hoist worm shaft and parts thereon.

Figure 16 is a sectional view of the drag drum shaft and parts supported thereon.

Figure 17 is a fragmentary detail sectional view showing the cooperation of the shackle with the door on the top of the car.

Figure 18 is a sectional view through the parts as shown in Figure 17.

Referring to the drawings it is noted that my crane comprises largely certain fixed features of crane design in that I utilize the customary traction frame or truck upon which is mounted a turntable that carries the power plant and general operating mechanism including gearing and cable winding drums, etc. At one end of the turntable is carried the pivoted boom, as customary, and the particular type of bucket or hoisting apparatus, which may include clamshell, orangepeel, dragline, and like buckets, a magnet, or hoisting tackle, connected with the boom in much the usual way, with some modification to be later presented.

The turntable is supported to rotate upon the traction frame or truck, in which is mounted certain variable speed gearing by which full length multiplane traction units are operated through gearing leading to the power plant on the turntable. The variable speed gearing aforesaid of course forms a part of the propelling mechanism for the crane by which the latter is fed to its work, so to speak, or moved from place to place, as occasion requires.

In the drawings the turntable is designated A″ the boom B″ the supporting multiplanes C″ and the clamshell bucket D″. The dragline bucket illustrated in Figure 3A is designated E″ and the turntable support F″ (see Figure 1) the latter supporting the turntable on the propelling or traction frame shown at G″. As the drives for operating the boom and the various buckets, as well as the propulsion means for the machine are taken off of the motor or engine, it will be desirable to first describe the power mechanism and gearing for operating the drums by which the boom is peaked in and out and by which the bucket and other cables for the various hoisting or excavating operations are actuated.

*Power plant and drive mechanisms on turntable*

The terms left and right hand sides of the machine will be used viewing the boom end of the machine as its front end and assuming that the operator is looking toward the boom and standing on the turntable A″. The engine or motor H″ may be of any suitable type and the crank or engine shaft 1 thereof is equipped with a pinion A which meshes with an idler gear B in mesh with a driven gear C at the left hand end of the jackshaft 3 which is shown best in Figure 4 of the drawings. The gear C is carried by a sleeve C′ equipped with a friction clutch 20, and said sleeve revolves without transmitting power except when the clutch 20 is thrown into engagement.

As above premised I have designed a special form of friction clutch for my machine and this form is used in practically all places where a friction clutch is described as employed. However, I do not wish to be limited to any peculiar form of clutch, so far as the practical embodiment of the various novel principles of my construction are concerned, the clutch itself being a separate and distinct invention which will be described later in detail.

Throwing of the clutch 20 into engagement will transmit movement of the gear C to the shaft 3 in an evident manner and different parts of the machinery may be operated from the shaft 3.

This power is taken from the shaft 3 and transmitted in one direction through another clutch 21 to the bevel driving gear U on shaft 3, said gear meshing with a bevel driven gear V fixed to the upper extremity of the vertical shaft 16. Motion is transmitted in an opposite direction from the shaft 3 through a clutch 22 corresponding with clutch 21, to a bevel gear W on the opposite side of the driven gear V carried by the shaft 16. The clutches 21 and 22 are used to operate the shaft 16 in opposite directions and said shaft carries the horizontal driving gear X engaging a horizontal driven gear Y, as seen in Figure 9. The gear Y is keyed to a vertical shaft 17 on the bottom frame of the turntable, which shaft 17 has secured to its lower extremity the driving pinion Z engaging the bull gear J″, the last gear being formed on the track and rack member F″ which is supported upon the base or traction unit of the crane. Rollers K″ are interposed between the bottom of the turntable and the track and rack member F″ and are preferably of double construction or arrangement at the boom end of the car and disposed singly at the rear end of the car, all traveling freely on the upper surface of the member F″.

It will be observed from the foregoing that the shaft 17 may be rotated in either of opposite directions in order to rotate the crane in one direction or the other dependent upon the control of the clutches 21 and 22.

Referring now to Figures 13 to 15 inclusive, the devices for operating the boom for peaking the point thereof in and out, or raising or lowering the boom respectively are shown. The said parts involve the use of three shafts, a shaft 13 located below the jackshaft 3 and having a gear L'' arranged to mesh with the gear D carried by the left end portion of the jackshaft 3. The gear L'' is fixed to a sleeve of a friction clutch 27 carried by the left end portion of the shaft 13 and by operating the clutch 27 to connect gear L'' and the shaft 13 motion will be transmitted from shaft 13 through a bevel gear 13' thereon to a bevel gear 14' on a wormshaft 14 which leads rearwardly from the shaft 13 at right angles thereto. The worm 14'' on the shaft 14 engages with a worm gear 15' on the boom hoisting drum shaft 15 which is located below the engine H'' and which is equipped with two drums designated 15ª and 15ᵇ and located near opposite ends of the shaft 15. From the drums 15ª and 15ᵇ lead off the hoisting cables for the boom B'' the said cables extending over sheave 50 at the top of the A frame on the turntable thence around sheaves 51 at the point of the boom after which they lead back through an equalizing sheave 52 mounted on the shackle 53 at the top of the frame. The peaking in and out of the boom by substantially the above means is a well known operation.

*High and low speed drives for hoisting and drag drums*

The main hoisting drums are located near the front end of the car as usual and are designated 40 and 41. It is proposed to drive these drums at high and low speeds, and the high speed drive will first be described. The left hand end of the jackshaft 3 carries the high speed driving gear D previously described as cooperating with the gear L'' of the boom hoisting drum apparatus. This high speed gear D meshes with the high speed driven gear E which is carried by the countershaft 4 located in advance of the jackshaft 3, see Figures 1, 4 and 8. A jaw clutch 28 is adapted to connect the gear E with the shaft 4. In a similar way the shaft 3 carries on its right hand end a slow speed driving gear F adapted to be connected with the shaft 3 by a clutch 30 similar to the clutch 28 aforesaid. A slow speed driven gear G engages the driving gear F and may be connected and disconnected in relation to the countershaft 4 by means of a jaw clutch 29 or any suitable clutch. As seen in Figure 8 the gear G has an extended hub carrying the hoisting driving gear AA, the latter meshing with a hoisting driving gear AB which is keyed to the right hand end of the hoisting shaft 11 on which the drum 40 is carried. A friction clutch 25 is utilized to transmit power from the shaft 11 to the drum 40. Likewise power is adapted to be transmitted from the shaft 11 to a gear AC keyed thereon and arranged in meshing relation with gear AD carried by the shaft 12, (see Figure 16), a friction clutch 26 being provided intermediate the shaft 12 and the drag drum 41 which is located below and somewhat in advance of the hoisting drum. The clutch 26 when operated will operatively connect the shaft 12 with the drum 41 in an evident manner and similar to the operation of clutch 25 and the drum 40.

Of course, if the operator throws out the clutch 30 and the clutch 28 is thrown in the hoisting drum 40 will be operated at high speed suitable for certain operations of the crane. A reversing of the action of said clutches will cause the drum to be actuated at slow speed. The clutch 29 might be dispensed with, its primary purpose being to enable the drive from the countershaft 4 to the drum shaft 11 to be entirely discontinued so that the drum shafts will not be in operation, along with their propelling gearing, if desired, when the crane is traveling from place to place and the hoisting mechanism is not in use.

Under operating conditions if the crane is equipped with a clamshell bucket according to Figure 1, and Figure 3, high speed travel of the bucket is desired and is readily obtainable by the operation of the clutch 28 and driving of the shaft 11 through the gear E. If some special operations with hoisting tackle are required to be performed by the crane, it is clear that a lower speed or drive of the hoisting cables may be obtained by discontinuing the drive from the gear E and utilizing that from the gear F, involving a mere shifting of the clutch 30 in the manner above set forth. This slow drive is the one suggested as very useful in column setting or placing of steel members in the fabrication of steel construction, and obviously no rebuilding of the crane is required in order to shift from one class of operation, such as clamshell work, to the slow speed hoisting work just mentioned.

Where a conversion of the crane from clamshell work to dragline work is required, in the usual type of machine the slow speed necessary for the dragline work necessitates that a rebuilding of the crane be attended to involving drum and gearing replacements well known to those versed in the art, and the cable leading from the top of the bucket point on the boom and power mechanism of the machine is changed to a two part line with a block, the two part line involving greater wear on the hoisting cable and the expedient creating more wearing parts likely to give trouble or get out of order and create expense and delay.

In the present design of variable speed drive mechanism for the power drums, the simple expedient of shifting from high speed to low speed driving of the drums already in use is resorted to, the different types of bucket and cable equipment being capable of use in connection with said drums and being largely the conventional equipment at present universally employed.

My two speed gearing is novel in its use for crane purposes, to decrease the speed and increase the pull on the line for both drums and obviously enables the use of my crane in a very flexible way so far as adaptations enabling it to do different kinds of work are concerned. Thus far of course I have not treated the combination of the variable speed drive gearing for the said drums 40 and 41 with the propelling mechanism of the machine and by which combination certain new and novel results are achieved in crane operation.

Crane propulsion means

Reference being had to Figures 9 and 10 to 12 inclusive particularly, it will be observed that power is taken from the motor and carried through the center pin down to the traction driving devices on the supporting truck or frame. It will be recalled that the countershaft 4 is the shaft equipped with the high and slow speed gears E and G respectively. The design of this invention is to utilize the said variable speed gears in conjunction with the drive gearing of the traction means whereby to operate the latter at different speeds. To transmit the power in one direction from the countershaft 4 to the propulsion or drive gearing of the traction mechanism the shaft 4 is equipped with the bevel gears H and I meshing with a bevel gear J mounted upon a longitudinal propelling shaft 5 extending forwardly from the shaft 4 at right angles thereto. On its front end the shaft 5 carries a bevel gear K meshing with a bevel gear L fixed to the upper end of a vertical shaft 6 which passes through the center pin M' of the circular track member J''. At its lower end the shaft 6 has a bevel gear M meshing with a corresponding gear N on a horizontal shaft 7 which extends rearwardly from the center pin M' and is equipped with a bevel gear O arranged to engage a bevel driven propelling gear P (see Figure 11) on the horizontal transverse shafts S'' and T'' journalled in the frame G'' of the traction support. From the shafts S'' and T'' motion is adapted to be transmitted by two speed gearing to the axle shafts 10, being the axle shafts of the two multiplanes N'', these multiplanes comprising units each composed of a frame having a multiplane or endless traction device mounted thereon by means of tumblers O'' and supporting and bearing rollers P''. As shown best in Figure 10, which is a bottom plan view of the traction support for the crane, the gear P is keyed to a sleeve Q'' of the spur gear R'' loosely mounted on the aligned shafts S'' and T''. The gear R'' is in engagement with a reduction gear U'' supported on an adjacent countershaft V'', see Figures 11 and 12. A further reduction of the speed is obtained by using the additional reducing gears W'' and X'' which are keyed on the opposite ends of the shaft V''. The gears W'' and X'' are in mesh with gears Y'' and Z'' respectively, the latter operating loosely on the shafts S'' and T'' respectively. Power is transmitted to the right hand multiplane through the gear AX (see Figure 10) on the outer end of the shaft S'', the said gear AX meshing with a gear BX on the inner end of the axle of the said left hand multiplane. In a similar manner power is transmitted to the other multiplane N'' by means of a gear CX adapted to mesh with a gear DX on the inner end of the drive shaft of the last mentioned multiplane, see Figure 11. Certain clutches, preferably of the jaw type, are utilized as common in variable speed mechanisms for shifting to obtain the different speeds available in the traction driving mechanism just referred to. Thus referring particularly to Figures 10 to 12, the jaw clutch EX is shifted so that it engages the bevel gear P in order that high speed may be transmitted to the right hand multiplane N'' through the shaft S''. If the clutch member EX is shifted to engage the gear Y'' a reduction of the speed is obtained because the power is transmitted from the gear R'' to the gear U'', to the gear W'', then to the gear Y'', and through the gears AX and BX to the said right hand multiplane which then travels at slower speed with a greater pulling power for obvious reasons. If it is desired that the opposite or left hand multiplane be driven at high speed, jaw clutch member FX is engaged with the gear R'' and the drive is at high speed through the gears CX and DX driven by shaft T'' to that particular multiplane. If, however, the clutch FX is engaged with gear Z'' the drive is through the gears R'' U'' X'' and Z'' at a reduced speed and with greater pulling power, the power being transmitted to the multiplanes thru the gears CX and DX. If the clutches FX and EX are simultaneously engaged with the gears R'' and P respectively, the multiplanes will travel forwardly or rearwardly at high speed, the reversal being accomplished of course by the control of the clutches 23 and 24. If, however, the clutches FX and EX are moved in opposite directions and simultaneously engaged with the gears Z'' and Y'' respectively, the two multiplanes will travel at low speed, and in either of reverse directions dependent upon whether the drive is taken from the gear H or the gear I.

For turning or steering purposes other combinative actions of the clutches may be used. Thus for instance, if the clutch FX is engaged with the gear R″ and the clutch EX with its adjacent gear Y″ the left hand multiplane will travel at high speed and the right hand multiplane at slow speed permitting of a steering operation to the right. Likewise if the reverse arrangement is had, respecting the clutches, and the clutch FX is engaged with the gear Z″ while the clutch EX is engaged with the gear P the multiplanes will have imparted thereto different speeds resulting in the turning of the machine to the left on a definite radius of curvature and at a predetermined speed.

It will be evident that if the mechanism just referred to is such as to produce two different speeds, and is driven from the jackshaft 4 which is adapted to be operated at different speeds, and the gear ratios for the several speeds are different, a four speed control of the traction multiplanes N″ is obtained. Should any of the gear ratios of the variable speeds in the lower traction driving mechanism synchronize with either one of the speed ratios of the upper variable speed gearing for the drums 40 and 41, a three speed control for the traction mechanism below would be had. The above matter is of course determined by the sizes of the gears and can be readily predetermined in an obvious manner. My invention contemplates the combination of the upper variable speed gearing for driving the hoisting drums, or hoisting and drag drums according as their functions may be, dependent upon the particular work, with either single or multiple speed drive gearing in the traction mechanism of the supporting traction unit for the crane.

Additionally my invention resides in the broader phase of combining the traction mechanism in such a way that it has a driven relation in respect to the driving instrumentalities for the hoisting drums, for there are many advantages for this arrangement aside from the variable speeds obtainable.

Roof door for car

The cab A″ of my crane is equipped with a door GX, seen best in Figure 1, and Figures 17 and 18, said door being hinged at its rear end to the top of the cab in an evident manner. This door GX is provided in order that the boom B″ may be peaked in so as to approach a vertical position, at which time the boom hoisting cables lift the door GX so that there will be no interference between the top of the cab and the boom operating cables incident to the foregoing action of the boom. The shackle 53 about which a portion of the boom hoisting cable HX passes is provided with brackets 54 projecting therefrom and having at their upper ends rollers 55. The rollers 55 operate in the grooves or tracks of channeled runways 56, one of which is provided on the under side of the door GX near each side edge of the latter. It will be apparent that the door is raised by the hoisting or peaking in of the boom causing the rollers 55 to operate in the runways 56 thereby providing in reality anti-friction bearings between the brackets and the door. The especially important function of the construction is to interlock the brackets 54 with the door GX by means of the rollers so that possibility of the door being blown over or twisted out of shape by the wind blowing against its lower surface is avoided. It is also novel to utilize an actuating means between the door GX and the shackle 53, an advantageous arrangement which will be self evident.

Cable arrangements

The cable arrangements are illustrated particularly in Figures 1 and 3 of the drawings, those of Figure 1 being largely as conventional in clamshell bucket equipment for cranes. The boom hoisting cable as previously stated is designated HX, the holding line for the clamshell bucket is designated XY and the closing line is designated ST. To prevent turning of the clamshell bucket D″ I utilize the tag line drum JX seen best in Figure 16, having a friction control, and a tag line KX which leads from said drum and is secured to one of the jaws of the clamshell bucket D″, see Figure 1.

The cable arrangements employed for the dragline bucket equipment and illustrated in Figure 3 in a general way, comprise the customary hoisting cable or line LX and the dragline MX arranged with the cables leading off to the drag drum and hoisting drums. The drums 40 and 41 are equipped with suitable sockets or holes for the steel sockets which are babbitted on the ends of the cables employed with the particular bucket used. When using the dragline bucket the dragline or cable is passed between a couple of horizontal sheaves and two vertical sheaves of the fair-lead casting NX shown best in Figures 1 and 2, this casting being attached to the platform of the machine between the lower points of the boom.

Friction clutch

The type of friction clutch employed by me in my crane construction is shown best in Figures 5 and 6, and comprises an exceedingly meritorious structure for crane and other uses. The clutch is of the class known as an outside band clutch. As above premised, the objection to such clutches heretofore has involved the unsatisfactory operation thereof which gives rise to undue wear between the friction drum bushing and the shaft on which it is mounted due to the pressure of the band in one direction against said drum. In the construction of my clutch I proceed on the theory of equalizing the pressure of the band means by causing the pressure thereof to be exerted in opposite directions.

In the drawings I have illustrated the friction clutch as used by me as the drag and hoist clutch controlling the operation of the drag drum 41, but in principle the same type of clutch is used in various places, certain of them having been referred to before as numbers 21, 22, 23, 24, 25, etc.

Referring to Figures 5 and 6, the clutch drum is designated as OX and may be of any suitable type, being loosely mounted upon a suitable shaft 60. Keyed to the shaft 60 at one side of the drum OX is a spider 61 and the clutch mechanism is mounted on this spider. In some cases if a gear happens to be located adjacent to the drum OX, or an equivalent drum, I am able to use said gear as the supporting means for the parts of the clutch mechanism. The spider 61 is best shown in Figure 6A, and has mounted upon diametrically opposite portions thereof toggle levers 62. The levers 62 comprise three arms, a short arm connected by a spring 63 with an adjacent portion of the spider 61, a longer arm 64 connected by a takeup bolt with an adjacent end of one of the friction band sections 65, and a third arm 66 formed with a ball end 67 received by a sectional socket 68 on the outer end of a toggle link 69. Each toggle link 69 while connected at its outer end with the arm 66 of the adjacent toggle lever is pivoted at its inner end as shown at 70 to an equalizing ring or member 71 which is mounted on a shifting sleeve 72 carrying also a shifting collar 73 by which the clutch mechanism may be operated by a shifting lever, the fork of which is not illustrated. The shifting fork is adapted to shift the collar 73 and the sleeve 72 and the ring 71 longitudinally of the shaft 60, in a well known manner.

The ring 71 is formed with a collar having a center opening somewhat elongated in the direction of the alignment of the toggle links 69. The purpose of this formation is to enable the ring 71 to shift slightly in the direction of either of the links 69, in the event one of the band sections 65 should be a little tighter than the other. The equalizing ring 71 is adapted to similarly shift laterally in its groove in the shifting sleeve 72 in order to secure an equalization of the forces applied in operating the band sections 65 to engage them with the drum OX.

It will be observed that the band sections 65 are each connected at one end with the spider and the opposite ends of the band sections are connected with the toggle levers 62 previously described. The respective ends of the band sections 65 are opposite one another. The pressure means for applying the friction of a particular band section being opposite that co-operating with the other band section, so that the pressure incident to throwing the clutch into action against the drum OX is obviously equalized and there is no tendency to produce wear in a single direction only between the bushing of the drum and the shaft on which it is supported. On shifting of the ring 71 inwards or toward the spider 61, when the shifting sleeve 72 is operated, the toggle links 69 tend to straighten and produce an outward push on the ball and socket connection 67 and 68. In this manner the levers 64 and 62 are rocked to pull on the takeup bolts 65' and thus pull the friction band sections 65 into positive engagement with opposite portions of the drum OX. The springs 63 might be dispensed with, and in fact I have built my clutch without them, but they are advantageous in effecting a quick normalizing of the toggle levers 62 and release of the band friction which as is well known has a tendency to stick to the drum owing to the suction pull. Also I may employ a simple pivotal connection between the parts 62 and 69 but the ball and socket connection illustrated is far preferable, owing to the slight turning tendency of the push on the links 69 respecting the levers 62.

*Lever stand for crane*

Figures 1 and 2 show in a general way the arrangement of the controlling levers at the right forward end of turntable A'' and I might note that these various levers designated 72 are connected by various levers and linkage parts to the different clutches and other operating members of the crane which are necessary to be shifted in obtaining the various desired actions of the hoisting, dragging, boom operating, turntable rotating and traction mechanism. As these particular parts may be varied considerably in construction for purposes of actual practice, I do not deem it necessary to detail their arrangement and operation as these will be clearly understood by engineers versed in the use of cranes of the type of my invention.

Having thus described my invention, what I claim as new and desire to secure by Letters Patent, is:

1. In a crane of the class described, the combination of a body, a boom mounted thereon and means for raising and lowering said boom, hoist drum mechanism comprising cable operating and hoisting drums mounted upon the body turntable, adapted to actuate interchangeable cable means to wind on and off said drums and to be connected with the boom for handling different classes of work, a motor, variable speed gearing connecting the motor and the drum mechanism, means to render either or both drums operative at will, and control means for the variable speed mechanism to vary the speed of driving of the drums to accord with the particular kind of cable means being handled by said boom and cable means.

2. A crane of the class described comprising a boom, hoisting and drag drums adapted to operate interchangeable types of cable means trained over the point of the boom and on to the said drums, cable means removable from the boom and drums for enabling substitution of other cable means for different kind of work, an engine for driving one or both of the drums at variable speeds from the engine, and control means for the variable speed means to change the speed of action of the drums when changing from one type of cable means to another.

3. A crane of the class described comprising a boom, hoisting and drag drums adapted to operate, interchangeable different types of cable and bucket equipments for said boom and drums, and speed varying means for the drums operable to change the speed of the drums according to the particular cable and bucket equipment being used, and means to control independent operation of the drums.

4. A locomotive crane such as described, comprising a boom, means for peaking the boom in and out, drum mechanism including hoisting and drag drums, a prime mover for the drum mechanism, the drum mechanism being adapted to operate either clamshell bucket and cable equipment or interchangeable drag-line bucket and cable equipment, and means to transmit variable motion from the prime mover to the drums changeable according to the particular bucket and cable equipment connected to coact with the drum mechanism.

5. A locomotive crane such as described, comprising a boom, means for peaking the boom in and out, drum mechanism including hoisting and drag drums adapted to operate clamshell bucket and cable equipment, or drag-line bucket and cable equipment, the drum mechanism being adapted for connection with such equipments without removal or alteration of the said mechanism, means to control independent action of the drums, and means to drive the drum mechanism at different speeds, a particular speed to accord with the particular equipment being used.

6. In a crane of the class described, the combination of a car, a turntable, and a boom mounted thereon and means for raising and lowering said boom, hoist drum mechanism coacting with the boom for handling different kinds of cable and bucket equipments and comprising a plurality of independently operable drums, power driven variable speed means for controlling the said drum mechanism, an engine adapted to drive the variable speed means, traction means for the car supporting the turntable, and operating connections leading from the traction means to the said variable speed means of the drum mechanism, whereby the traction means may be driven at variable speeds.

7. In a crane of the class described, the combination of a car, a body, and a boom mounted thereon and means for raising and lowering said boom, hoisting drum mechanism connected with the boom for handling different classes of loads, power driven variable speed means for controlling the said drum mechanism, traction means for the car for moving the same to its work and from place to place, variable speed gearing for driving the traction means, and connections for communicating motion from the first mentioned to the last mentioned variable speed devices.

8. A crane of the class described comprising a boom, hoisting and drag drums adapted to be used with interchangeable different types of cable and bucket equipments for said boom and drums, speed varying means for the drums operable to accommodate the drum action to the particular cable and bucket equipment being used, traction means for the car, and operating connections leading from the traction means to the said variable speed means of the drum mechanism, whereby the traction means may be driven at variable speeds.

9. In a portable crane of the class described, the combination of a car comprising a power plant, a hoisting drum mechanism, a boom carried by the car, control means and high and low speed gear devices for connecting the power mechanism with the hoisting drum mechanism, the high and low speed gear devices being adapted to be alternatively put into action to drive the drum mechanism at either high or low speed, combined with traction devices supporting the car for movement, and drive gearing for said traction devices operable from the high and low speed gearings for the hoisting drum mechanism, whereby the traction mechanism may be driven at corresponding speeds, the drive gearing last mentioned comprising change speed devices, whereby the traction mechanism may be operated through the combination action of said change speed devices and the high and low speed drive gearing for the hoisting drum mechanism.

10. In a portable crane, the combination of a car, a boom, hoisting drum mechanism on the car, cable means connected with the drum mechanism and boom for handling work, power mechanism, means to operate the drum mechanism at variable speeds from the power mechanism, traction devices for the car, and change speed means to operate the traction devices from the power mechanism through the said variable speed means for the drum mechanism.

11. In a crane, in combination a car, a traction support therefor, drum mechanism mounted on the car and comprising a plurality of drums adapted to be connected with clam shell or drag line cable and bucket equipments, means to control simultaneous or independent operation of the drums, an engine, variable speed mechanism intermediate the engine and said drum mechanism, separate traction devices on the traction support, and means to actuate said traction devices from the variable speed mechanism to establish driving relations therebetween for steering the crane when moving on said traction support.

12. A crane of the class described, comprising a boom, hoisting cable mechanism for said boom, a roof door for the crane operable incident to entering movement of the hoisting cable relatively to the car, the operating means for said roof door including a shackle connected with the car and about which the hoisting cable operates, and interlocking means between said shackle and the roof door for shifting the door upwardly and downwardly according as the hoisting cable of the boom is moved upwardly and downwardly in peaking the boom in and out.

13. Means substantially as claimed in claim 12 wherein the interlocking means comprises brackets projecting upwardly from said shackle, and channel members interlockingly engaging said brackets and carried by the roof door.

14. Means substantially as claimed in claim 12 wherein the interlocking means comprises brackets projecting upwardly from said shackle, and channel members interlockingly engaging said brackets and carried by the roof door, the interlocking portions of the channel members and brackets including rollers rotative on the brackets and forming anti-friction bearings intermediate the channel members and the brackets.

15. In a crane of the class described, the combination of a car, a boom mounted thereon, hoist drum mechanism comprising drums mounted upon the car, to be used with different kinds of cable means to wind on and off said drums and adapted to be connected with the boom for handling different classes of work, means to control independent and simultaneous operation of the drums, a motor, variable speed gearing connecting the motor and the drum mechanism, and control means for the variable speed mechanism to vary the speed of driving of the drums to accord with the particular kind of cable means used for work being handled by said boom and cable means.

16. In a crane, in combination, a car, a traction support therefor, an engine on the car, drum mechanism on the car comprising independently controllable hoisting and drag drums adapted to operate a drag line cable and bucket equipment, and also adapted to operate the hoisting and holding lines of clam shell bucket equipment, and means for driving the said drums slowly from said engine when the drag line bucket equipment is applied to said drums, and driving said drum mechanism at required high speed when said drum mechanism is being used in connection with the clam shell bucket equipment.

17. In a crane, in combination a car, a traction support therefor, an engine on the car, drum mechanism on the car comprising separately and simultaneously operable hoisting and drag drums adapted to operate a drag line cable and bucket equipment, and also adapted to operate the hoisting and holding lines of clam shell bucket equipment, means for driving the said drums slowly from said engine when the drag line bucket equipment is applied to said drums, and driving said drum mechanism at required high speed when said drum mechanism is being used in connection with the clam shell bucket equipment, the traction support comprising traction devices, and means for transmitting the slow and high speed actions of the engine, as above mentioned, to said traction devices.

18. In a crane, in combination a car, a traction support therefor, an engine on the car, drum mechanism on the car comprising hoisting and drag drums adapted to operate a drag line cable and bucket equipment, and also adapted to operate the hoisting and holding lines of clam shell bucket equipment, means for driving the said drums slowly from said engine when the drag line bucket equipment is applied to said drums, and driving said drum mechanism at required high speed when said drum mechanism is being used in connection with the clam shell bucket equipment, the traction support comprising traction devices and means for transmitting the slow and high speed actions of the engine, as above mentioned to said traction devices to effect a slow speed action of one traction device and a high speed action of the other, or vice versa.

19. In a crane of the class described in combination, a car, an engine thereon, drive mechanism thereon, a traction base for said car embodying traction devices by which the car may be propelled, drum mechanism to operate different boom and bucket equipments, a change speed operating mechanism mounted upon the car to drive the drum mechanism from the engine, the car comprising a turntable on which the engine and drum mechanism are mounted, together with driving means for transmitting the different speeds of the change speed mechanism on the turntable aforesaid to the supporting traction devices for the purpose described, and means for applying the speed action transmitted to the traction devices in different ways to effect steering and straight progressive motion operations of said traction devices.

20. In a crane of the class described in combination, a traction base, a car comprising a turntable mounted upon said traction base, an engine carried by the turntable, crane drum mechanism mounted on the turntable operable from said engine, the traction base embodying separate traction devices adapted to travel at the same or different speeds, change speed mechanism upon the turntable and operable by said engine, means for changing the speed action of the said change speed mechanism to the traction devices in different ways to effect steering and straight progressive motions of said traction devices, together with means on the turntable for controlling the change speed action of said change speed mechanism and also for controlling the application of the said change speed action to the traction devices.

21. In a crane, in combination, a traction base, a car body mounted upon said base, an engine carried by said car body, a jack shaft operatively driven from said engine, swing gear mechanism for turning the car body on the traction base and directly connected for operation by said jack shaft, a counter shaft adapted to be driven by said jack shaft, traction drive gearing operated from said counter shaft, the traction drive gearing comprising mechanism for reversibly driving the traction means of the traction base, and also comprising change speed gear devices for controlling operation of separate traction devices to move at the same or different speeds.

In testimony whereof I affix my signature.

ALPHEUS E. HOLCOMB.